United States Patent Office.

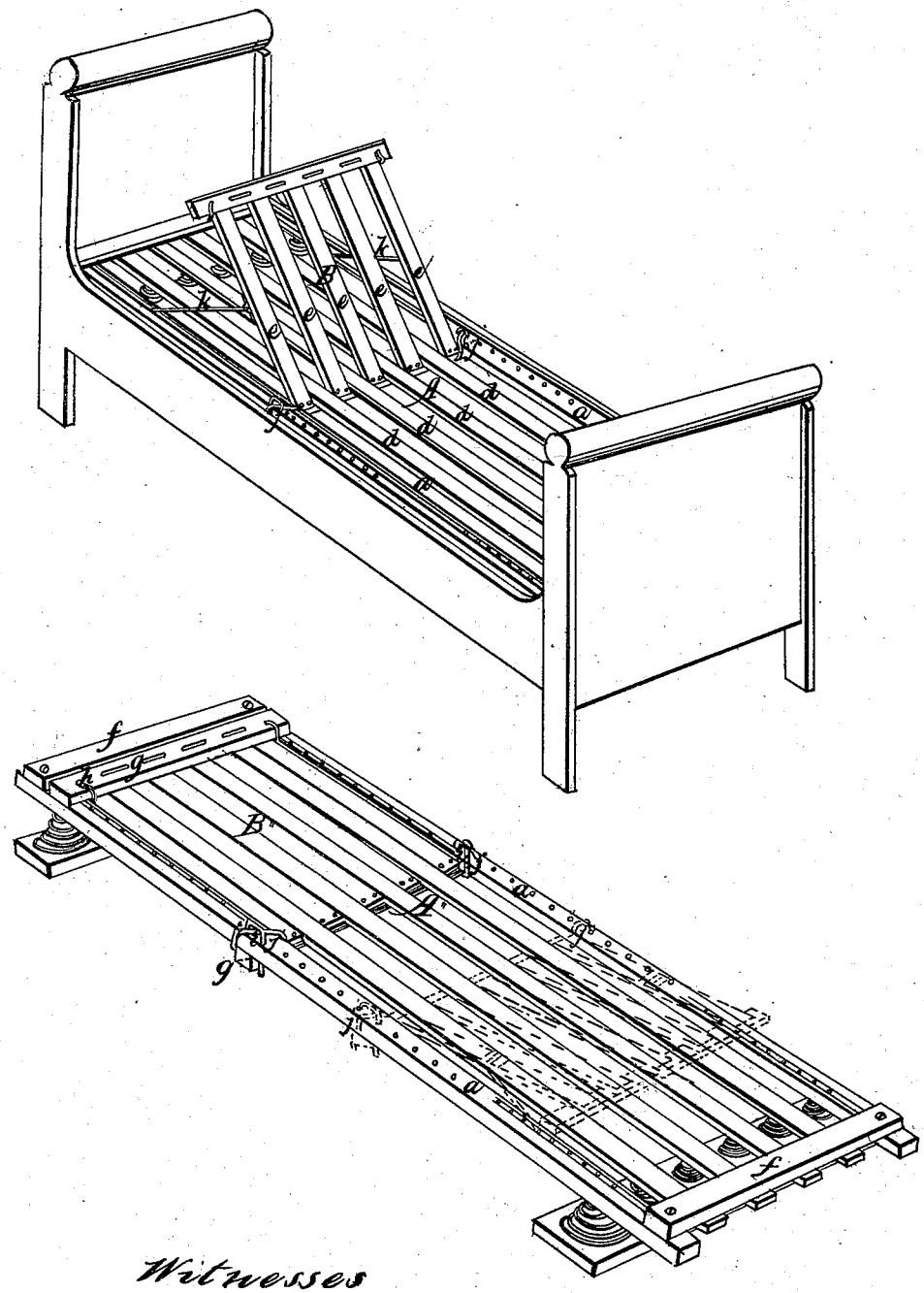

DANIEL C. COLBY, OF WASHINGTON, DISTRICT OF COLUMBIA.

Letters Patent No. 66,564, dated July 9, 1867.

---

IMPROVED BED-BOTTOM.

---

The Schedule referred to in these Letters Patent and making part of the same.

---

TO ALL WHOM IT MAY CONCERN:

Be it known that I, DANIEL C. COLBY, of the city of Washington, in the District of Columbia, have invented certain new and useful improvements in Bed-Bottoms; and I do hereby declare the following to be a full and exact description of the same, reference being had to the engravings which accompany and form a part of these specifications, in which—

Figure I represents the article in perspective.

Figure II, a view of it on a bedstead, showing the extra frame B raised to aid a person to sit up in bed when desiring so to do.

Letter A, a series of slats extending nearly the length of the bedstead.

Letter B, a frame of an extra series of short slats, e e e, extending from the head a little less than one-half way down the bed.

Letter C, bedstead, which may be of any style or fashion.

Letters a a, the two outer slats of the frame A.

Letters d d d, the other slats of the frame A and considerably thinner than a a.

Letters e e e e, slats forming the principal part of the frame B.

Letters f f, two cross-bars connecting the two outer slats a a, one at the head and the other at the foot.

Letters g g', the two end pieces of the frame B, g at the head an elastic strap or cord, h, interlaced with it, as seen in the drawings, and to this strap the slats e e e e are attached beneath the bar g.

Letter g' lies beneath the frame A, and is attached firmly to each of the slats e e.

Letters i i, two elastic straps or cords passing around the slats a a and the bar g' to sustain this end of the frame B.

Letters j j, two staples passing astride the cords i i to keep them in position, and the frame B may be placed at any point up and down the length of the frame A simply by having a series of holes for the staples j j, as shown by figs. 1 1 1 1 in the drawings.

Letters k k, two rods or bars attached to the two outer slats of the frame B, and serve to sustain the said frame when raised as in Fig. II.

Figures 2 2 2 2, along the bars a a, are holes to receive the foot of the rods k k. These being numerous along the bars a a, allow of raising the frame B more or less, as desired, and at any place along the bed.

To guide the rods k k when the frame B is being raised the grooves m m are run along the top of the slats a a.

The object of my invention is to provide a spring-bed bottom for family use, provided with the means of raising and adjusting the head thereof for sick persons, and to so construct the said adjustable parts and combine them as to make them operative at either end of the bed or at any place between the two ends. The red lines in the drawings show the frame B turned to the foot, and while in this way may be raised more or less to suit the comfort of a painful limb. In cases of "prolapsus uteri," or the like, the extra frame B would be arranged near the centre of the bed and raised to suit the occasion.

What I claim as my invention, and desire to secure by Letters Patent, is—

1. The combination of the extra frame B, or its equivalent, with the ordinary spring-bed bottom, when arranged and operating substantially as and for the purposes set forth.

2. The combination of the rod g', the elastic straps or cords i i, or their equivalent, the bars a a, and the staples j j, as and for the purposes shown.

3. The use of the rods k k, in conjunction with the bars a a, straps i i, and staples j j, to sustain the frame B in the various positions shown and described.

DANIEL C. COLBY.

Witnesses:
ARTHUR PRENTISS,
A. M. BACON.